June 20, 1961  J. B. ARMITAGE ET AL  2,988,965
SPINDLE CONSTRUCTION AND DUAL TRANSMISSION THEREFOR
Original Filed June 14, 1954  3 Sheets-Sheet 1

Fig. 1

INVENTORS
Joseph B. Armitage, Theodore A. Wetzel
Gerhard G. Baumbach, Frank Zankl
BY
Attorney

United States Patent Office 2,988,965
Patented June 20, 1961

2,988,965
SPINDLE CONSTRUCTION AND DUAL TRANSMISSION THEREFOR
Joseph B. Armitage, Wauwatosa, Theodore A. Wetzel, Brookfield, and Gerhard G. Baumbach and Frank Zankl, Milwaukee, Wis., assignors to Kearney & Trecker Corporation, West Allis, Wis., a corporation of Wisconsin
Original application June 14, 1954, Ser. No. 436,358, now Patent No. 2,843,024, dated July 15, 1958. Divided and this application Feb. 24, 1958, Ser. No. 720,519
12 Claims. (Cl. 90—11)

This application is a division of an original application of Joseph B. Armitage, Theodore A. Wetzel, Gerhard Baumbach and Frank Zankl, Serial No. 436,358, filed June 14, 1954 and entitled Dual Transmission and Control Mechanism, now Patent No. 2,843,024 issued July 15, 1958.

This invention relates generally to machine tools and more particularly to an improved spindle construction and dual transmission therefor which permits of operation of the spindle over a wide speed range and accommodates for dimensional changes in bearing over the wide speed range.

A general object of this invention is to provide an improved spindle for a milling machine adapted to be operated over a wide speed range and having resilient means to compensate for temperature changes in the bearings.

Another object of the invention is to provide an improved milling machine provided with two separate power sources selectively connectable to drive the tool spindle thereof throughout an extremely wide range of output speeds.

Another object of the invention is to provide improved means for journalling a machine tool spindle to rotate throughout an extremely wide range of output speeds.

Another object is to provide an improved geared driving train in combination with a direct motor drive adapted to be selectively connected to drive the tool spindle of a milling machine throughout an extremely wide range of output speeds.

According to this invention, an improved spindle head having improved means for journalling a spindle therein as well as two separate power sources selectively connectable to drive the spindle throughout an extremely wide range of operating speeds, is provided. The spindle is arranged to be driven at a selected speed in a relatively low range by a variable speed transmission, or at an extremely high operating speed by a separate high speed motor. An interlock arrangement is provided to preclude energization of the high speed motor whenever the spindle is connected to be driven in the relatively low speed range. A novel bearing arrangement for the spindle is provided that permits of limited axial movement of the outer race of the upper or inner bearing to thereby compensate for temperature changes that occur as the spindle is adjusted to rotate at the highest speeds. The arrangement eliminates binding and overloading of the bearings to prevent overheating and possibility of bearing failure. Provisions have been made to prevent admission of lubricant into the portion of the spindle head in which the high speed motor is located to thereby protect the motor. The novel arrangement for preventing admission of lubricant to the motor compartment, also, cooperates to retain lubricant within a hollow central portion of the spindle head, that constitutes a gear compartment for gears associated with the spindle drive.

The invention is exemplified herein by embodiments illustrated in connection with a general representation of a typical machine tool structure. It is to be understood, however, that the particular embodiments shown are intended to be illustrative only and that various other structural forms within the range of equivalents of the features defined in the subjoined claims, may be utilized in practicing this invention in connection with any of various other machine tools or similar apparatus.

The foregoing and other objects of this invention, which will become more fully apparent from the following detailed description, may be achieved by the particular apparatus that is depicted in and described in connection with the following drawings, in which.

The particular apparatus shown in the accompanying drawings as exemplifying a preferred embodiment of the present invention is a spindle construction for a vertical spindle milling machine of the knee and column type. It will be understood, however, that any modifications may be made in the specific structural details thereof within the scope of the appended claims without departing from the spirit of the invention.

Figure 1:
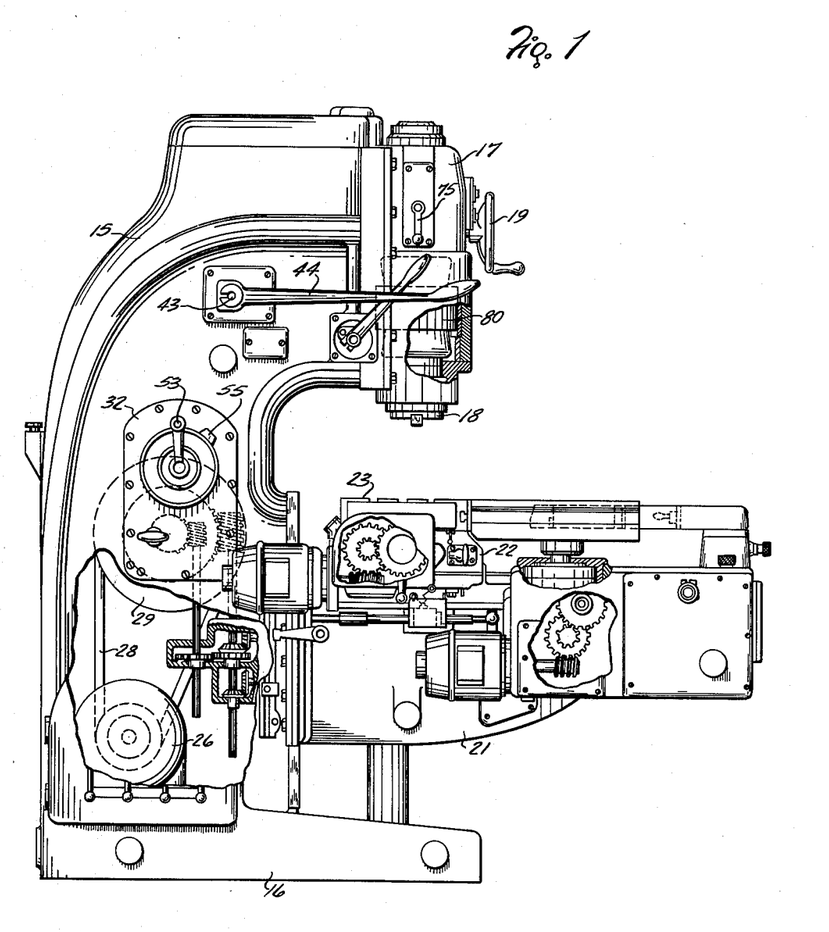
FIGURE 1 is a view in side elevation of a vertical spindle milling machine with parts of the machine broken away to show some of the internal operating mechanism and exemplifying a machine tool in which the features of the present invention may be incorporated to advantage.

Referring more specifically to the drawings, and particularly to FIG. 1 thereof, the machine tool there shown, in which the present novel invention may be incorporated to advantage, is a knee type milling machine of the vertical spindle type having as its principal supporting frame a vertically upstanding column 15 formed integrally with a forwardly extending base 16. At its upper forward portion, the column 15 is disposed to slidably support a spindle carrying head 17 for selective vertical adjustment. A depending vertical tool or cutter spindle 18 is rotatably journalled in the spindle head 17 for selective vertical adjustment therewith. To effect vertical adjustment of the spindle head 17, there is provided a rotatable handwheel 19 journalled in the column 15 and connected in well known manner to actuate a screw and nut actuating mechanism (not shown).

Beneath the vertical tool spindle 18, the column 15 is adapted to movably support a plurality of slidably superimposed work supporting members including a knee 21, a saddle 22 and a work table 23. The knee 21 is slidably carried on the front face of the column 15 for selective vertical movement therealong and, in turn, is arranged to slidably support on its upper surface the saddle 22 which is mounted for slidable transverse movement toward or away from the front face of the column 15. The work table 23 is slidably carried on the top surface of the saddle 22 for longitudinal movement in a plane transverse to the plane in which the saddle is movable.

Figure 2:
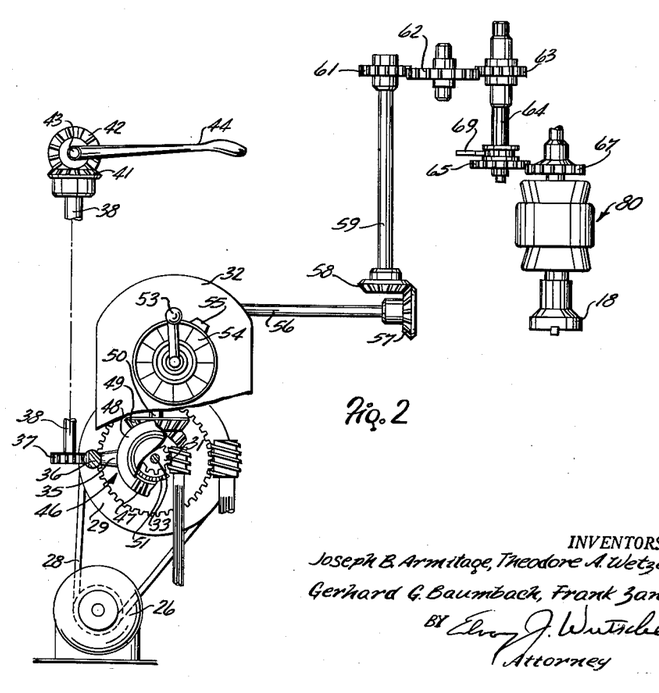
FIG. 2 is a diagrammatic view of the transmission and control mechanism employed in operating the spindle.

Power for driving the various movable elements of the machine including the knee 21, the saddle 22, and the work table 23, as well as for rotating the tool spindle 18 is derived from a main drive motor 26 carried within the hollow lower portion of the column 15 as shown in FIGS. 1 and 2. From the main drive motor 26, power is transmitted by means of multiple V-belts 28 to rotate a main drive pulley 29 journalled within the central portion of the hollow column 15 on the rearwardly extending end of a hollow main transmission shaft 31 journalled in a speed changing transmission mechanism 32.

For selectively coupling the main drive pulley 29 into driving engagement with the hollow transmission shaft 31, there is provided a clutch mechanism (not shown) at the rearward end of the shaft 31 and that is connected to be selectively engaged by longitudinal axial movement of a shifter rod 33 slidably carried within the hollow shaft 31. The shifter rod 33 is connected to be moved by a shifter fork 35 secured to a horizontally movable rack 36, slidably carried in the column 15 for longitudinal movement. The rack 36 is provided with rack teeth having meshing engagement with the complementary gear teeth of a rotatable pinion 37 secured to the lower end of an upwardly extending vertical control shaft 38 rotatably journalled in the column 15. At its upper end, the rotatable control shaft 38 carries a bevel gear 41 that is disposed to be engaged by a complementary bevel gear 42 secured to the inner end of a horizontal stub shaft 43 rotatably journalled in a side wall of the column 15 as shown in FIGS. 1 and 2. A pivotally movable clutch control lever 44 is secured to the outer end of the stub shaft 43 for rotating the pinion 37 to effect axial shifting movement of the shifter rod 33 and thus coupling the main drive pulley 29 into driving engagement with the hollow transmission shaft 31.

From the hollow main transmission shaft 31 power is transmitted to a reversing mechanism 46 constituted by a pair of rotatable bevel gears 47 and 48 journalled on the shaft 31 and having meshing engagement with a complementary driven bevel gear 49 secured to the lower end of a rotatable input shaft 50. Adjacent their inwardly extending hubs, the bevel gears 47 and 48 are provided with circumferentially spaced clutch teeth (not shown) respectively disposed to have meshing engagement with complementary clutch teeth formed on the opposite ends of an axially shiftable clutch collar 51 that is movably carried therebetween in slidably splined engagement with the transmission shaft 31. By means of this arrangement, the clutch collar 51 is movable into clutching engagement with one or the other of the bevel gears 47 or 48 to transmit power for rotating the driven bevel gear 49 and input shaft 50 in a selected direction of rotation.

The input shaft 50 is journalled to rotate in the speed changing mechanism 32 which is preferably of the shiftable geared type providing fixed steps of output driving power. To selectively adjust the output speed rate of the spindle speed transmission 32, a speed selecting crank 33 journalled for rotation in the outer wall thereof is connected to selectively actuate a speed selecting mechanism (not shown). For determining the selected rate of speed, the crank 33 is likewise connected to effect positioning movement of a concentrically rotatable speed selecting dial 54 bearing appropriate indicia adapted to be read against a stationary indicator mark 55.

Figures 4, 5, 6:
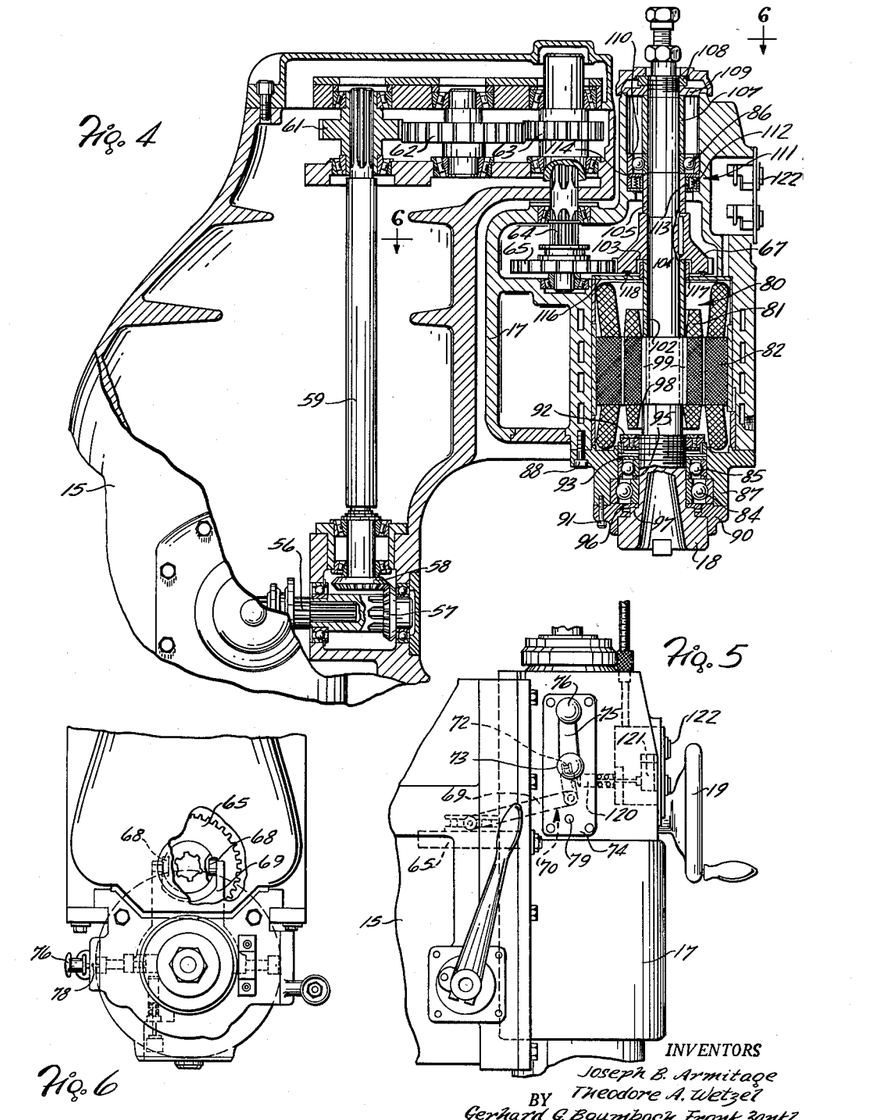
FIG. 4 is an enlarged fragmentary view in transverse vertical section through the upper portion of the machine, including the spindle head.
FIG. 5 is a fragmentary view in left side elevation of the upper portion of the machine showing the electrical interlock for the spindle motor.
FIG. 6 is a view in horizontal transverse section through the upper portion of the machine and taken along the line 6—6 in FIG. 4.

From the speed transmission mechanism, power is transmitted to rotate a horizontal output shaft 56 journalled to rotate within the upper central portion of the hollow column 15, as shown in FIGS. 2 and 4. From the shaft 56 power is transmitted through a bevel gear 57 secured thereto and thence to a complementary bevel gear 58 secured to a vertical shaft 59 journalled to rotate in the upper forward portion of the column 15 in parallelism with the vertical tool spindle 18. A spur gear 61 splined to the upper end of the vertical shaft 59 is disposed to meshingly engage an idler gear 62 which in turn transmits power to rotate a complementary spur gear 63 journalled to rotate in the extreme upper forward portion of the column 15 and in overlying relationship with a rearwardly extending portion of the spindle head 17. The spur gear 63, journalled in the column 15, is provided with internal splines disposed to slidably engage the splined upper end of a vertical input shaft 64 journalled at its lower end to rotate within the rearwardly extending portion of the spindle head 17. Thus, by means of the slidable splined connection between the gear 63 and the vertical shaft 64, spindle driving power may be transmitted from the column 15 to the spindle head 17 in any selected position of vertical adjustment of the spindle head within its allowable range of adjustment relative to the supporting column 15.

For transmitting power from the shaft 64 to drive the vertical tool spindle 18, a shiftable gear 65 is slidably splined to the lower end of the shaft 64 for selective shiftable movement into meshing engagement with a complementary spindle drive gear 67 keyed to the central portion of the tool spindle 18. With the shiftable gear 65 in meshing engagement with the spindle driving gear 67 as shown in FIGS. 2 and 4, and the clutch control lever 44 in engaged position for coupling the main drive motor 26 to drive the hollow transmission shaft 31, power is transmitted from the main drive motor 26 to rotate the tool spindle 18 at a selected speed determined by the adjustment of the variable speed transmission mechanism 32.

To effect selective shiftable movement of the gear 65 along the vertical shaft 64, as shown in FIGS. 4, 5 and 6, a pair of shoes 68 carried at the extreme outer ends of a forked arm 69 of a pivotal bell crank 70 are disposed to engage an annular groove formed in an enlarged hub of the gear 65. The bell crank 70 is pivotally mounted within the hollow spindle head 17 and is provided with an angularly diverging opposite arm that is slotted toward its outer end to slidably receive an eccentric actuating pin 72 fixedly secured to the inner end of a stub shaft 73. The stub shaft 73 is rotatably journalled in a bracket 74 secured to an outer side wall of the spindle head 17 and has secured to its outer end the hub of a pivotally movable shifter crank 75. The shifter crank 75 is provided with a resiliently returnable latching knob 76 adapted to selectively withdraw a latching pin 78 for engagement with an upper latching notch formed in the bracket 74 or with a lower notch 79 formed therein. With the shifter crank 75 positioned, as shown in FIG. 6, in a manner that the latching pin 78 engages the upper notch, the bell crank 70 is so positioned as to retain the shiftable gear 65 in meshing engagement with the spindle driving gear 67. As the shifting crank 75 is moved downwardly to its opposite position, the eccentrically positioned pin 72 secured to the stub shaft 73 is caused to slidably engage the slot formed in the crank arm to pivot the bell crank 70 and thus urge the shiftable gear 65 upwardly and out of engagement with the spindle driving gear 67. With the shifter crank moved to its extreme opposite position in a manner that the latching pin 78 engages the lower notch 79 the shiftable gear 65 will be retained in an upward disengaged position for interrupting the transmission of power to the spindle drive gear 67.

The spindle driving train hereinbefore described including the main drive motor 26 and the variable speed transmission 32, is operable to supply power for driving the tool spindle 18 at a selected speed in a relatively low range of driving speeds that is not only adequate, but necessary for many machining operations. With the advent of newer milling cutters and improved metal cutting techniques, however, certain machining operations, particularly those involving non-ferrous materials, require extremely high spindle and cutter speeds. To this end, the tool spindle is adapted to be driven alternatively by a high speed motor 80 mounted within the spindle head 17 and that is connected to be selectively energizable whenever the slidable gear 65 is shifted upwardly into disengaged power interrupting position relative to the spindle drive gear 67.

The high speed motor 80 comprises a rotor 81 keyed directly to the central portion of the tool spindle 18 immediately below the spindle driving gear 67 and adapted to rotate within a cooperating stator 82 secured within the spindle head 17. It is contemplated that the motor 80 be energizable to rotate the tool spindle at a selected high operating speed, for example, 3600 r.p.m. and 7200 r.p.m., through the use of a frequency converter. However, it is to be understood that any other suitable independent motor may be utilized to drive the tool spindle, whether it be energizable to operate at a single output speed or at a plurality of different speeds. The principal requirement is that the motor connected to independently drive the tool spindle 18 be operable at speeds different than the speeds obtainable from the variable speed transmission mechanism 32. With the combination of the independent spindle motor 80 and the spindle driving train including the variable speed transmission 32, the utmost flexibility in selecting the most appropriate cutting speed for the widest possible variety of machining operations is provided. With the transmission adjusted to the lowest output speed, for example, the tool spindle may be operated to rotate a large diameter cutter for certain machining operations. With the high speed motor connected to drive the spindle at 7200 r.p.m. on the other hand, the spindle may be operated to rotate a very small diameter cutter with equal facility and efficiency of operation. Likewise, the tool spindle may be connected to be driven at a required speed intermediate the lowest speed available from the variable speed transmission 32 and the speeds from the motor 80.

In order that the tool spindle 18 may be rotated throughout such an extremely wide range of operating speeds, the spindle is journalled at its lower end in bearings 84 and 85, as shown in FIG. 4, that are arranged to restrain it against vertical axial movement in either direction, irrespective of the selected operating speed. Toward its upper end, the spindle 18 is rotatably journalled in a bearing 86, the outer race of which is resiliently biased for a limited axial movement to compensate for temperature changes that occur as the spindle is adjusted to rotate at the highest speeds. This arrangement obviates binding and overloading of the bearings with the attendant overheating and possibility of bearing failure.

To accomplish this, the outer race of the lower spindle bearing 84 is fixedly retained within a circular recess formed in a bearing housing 87 that is secured to the underside of the hollow spindle head 17 by means of cap screws 88. A flanged bearing retainer 90 is in turn secured to the underside of the housing 84 by means of cap screws 91 and with its inner flanged shoulder in abutting engagement with the outer race of the lower bearing 84 to restrain the bearing against axial movement in either direction. The spindle 18 is fixedly secured to the inner races of the lower bearings 85 and 84 by means of an adjustable spindle nut 92 threaded on the lower portion of the spindle 18 into abutting engagement with a circular grease retainer 93 that encircles the spindle immediately above the bearing 85. A shoulder on the grease retainer is clamped against the inner race of the bearing 85, the outer race of which is received within a circular bore formed in the bearing housing 87. At its opposite side the inner race of the bearing 85 is clamped against a thrust washer 95 that abuts the inner race of the lower bearing 84 and that in turn is clamped against a circular flanged lower grease retainer 96 abutting a flanged peripheral shoulder 97 formed toward the lower end of the spindle 18.

The bearing housing 87 defines the lower end of a circular compartment formed within the lower central portion of the spindle head 17 for receiving the independent motor 80, and the stator 82 which is fixedly secured within the spindle head 17 concentrically with the tool spindle 18. The cooperating rotor 81 for the motor 80 is keyed by means of keys 99 to a portion of the tool spindle 18 of reduced diameter, immediately above a flanged peripheral shoulder 98 formed thereon. The lower end of the rotor 81 is maintained in abutting engagement with the spindle shoulder 98 by a spacer sleeve 102 encircling the spindle 18 and engaging the upper end of the rotor. The sleeve 102 extends upwardly out of the motor compartment in a manner that its opposite end is maintained in engagement with a recessed shoulder 103 formed on the underside of the spindle drive gear 67. The spindle drive gear 67 is secured to the spindle 18 by a key 104 and is provided with an upwardly extending hub that is maintained in abutting engagement with the lower end of a middle spacer sleeve 105 encircling the spindle 18. At its upper end, the sleeve 105 engages the inner race of the upper spindle bearing 86 which is retained in fixed relationship along the spindle 18 by clamping engagement against an upper spacer sleeve 107. To retain the elements encircling the spindle 18 in endwise clamping engagement, a spindle clamp nut 108 threaded to the upper end of the spindle 18 is disposed to urge an upper circular member 109 downwardly into clamping engagement with the upper end of the upper spindle spacer sleeve 107.

To permit a limited axial movement of the upper spindle bearing 86, the outer race thereof is slidably carried within a circular bored opening 110 formed in the upper portion of the spindle head 17. A resilient bearing retainer 111 seated against an inwardly extending circumferential flange formed at the lower end of the opening 110 is disposed to urge the outer race of the bearing 86 upwardly. The resilient bearing retainer or mount 111 comprises essentially a plurality of circumferentially spaced compression springs 112 seated at their lower ends within a spring retainer member 113 encircling the middle spindle sleeve 105. The upper ends of the springs 112 are disposed to exert a balanced upward resilient force against a thrust washer 114 that abuts the underside of the outer race of the spindle bearing 86. Upwardly urged movement of the outer race of the bearing 86 is limited because the inner race thereof is retained in axially fixed relationship to the spindle 18 by means of the clamping engagement between the middle and upper bearing sleeves 105 and 107 respectively. However, the entire bearing 86 is free to move axially in either direction as the tool spindle 18 is caused to contract or expand longitudinally as a result of the changing operating temperatures caused by operating the tool spindle at different selected speeds throughout its allowable range. At the same time, the lower tool carrying end of the spindle 18 is continuously maintained in fixed axial relationship to the spindle head 17 by the lower bearings 84 and 85 to insure accuracy of a cutting operation at any operating speed and irrespective of the axial movement of the upper bearing 86.

To protect the motor 80 against the admission of lubricant, a circular shield 116 having a central circular opening for receiving the tool spindle 18 is tightly fitted in the upper end of the circular motor recess formed within the lower central portion of the hollow spindle head 17. Within the central circular opening formed in the shield 116 is fitted an upwardly extending sleeve extension 117 of the shield disposed to encircle the spindle and extend upwardly within the circular recess formed in the underside of the spindle driving gear 67.

As a further deterrent to the admission of lubricant into the motor compartment, the circular shield 116 is provided with an upwardly extending circular flange 118 extending upwardly into a complementary circular groove formed in the bottom face of the spindle drive gear 67. Thus, the shield 116, together with the upwardly extending sleeve extension 117 and extension flange 118, is adapted to retain lubricant within the hollow central portion of the spindle head 17 that constitutes a gear compartment for the shiftable gear 65 and the spindle driving gear 67. Likewise, the shield 116 cooperates with the enlarged circular recess formed toward the lower portion of the spindle head 17 to constitute a protective enclosure for the motor 80.

As a prerequisite to energizing the high speed motor 80 for driving the tool spindle 18 at extremely high speeds, it is necessary to pivot the shifter crank 75 to its downward position and thus effect an upward shiftable movement of the gear 65 into disengaged position relative to the spindle driving gear 67. Simultaneously with the shifting movement of the gear 65, the downward pivotal movement of the shifter crank 75, causes the upper slotted arm 70 to move rightwardly to actuate a switch actuating plunger 120 slidably carried in the spindle head 17 as shown in FIG. 5. Rightward movement of the horizontally slidable plunger 120 operates to depress an actuating button of a normally open switch 121 that is operatively connected in a low voltage control circuit for the motor 80 as will hereinafter be more fully explained. Whenever the switch 121 is actuated to a closed position by rightward movement of the actuating plunger 120, the motor 80 is selectively energizable to drive the tool spindle 18 at high speed by depressing a motor start button switch 122 at the front upper portion of the spindle head 17. Conversely, since the plunger 120 is normally resiliently biased in a leftward direction, upward pivotal movement of the shifter crank 75 to its engaged position shown in FIG. 6 permits leftward movement of the plunger 120 to actuate the switch 121 to its normally open position and thus interrupting the low voltage control circuit for the motor 80. By means of this arrangement, the shifter crank 75 together with the actuating plunger 120 and the normally open switch 121 operate as an interlock to preclude energization of the high speed motor 80 whenever the shiftable gear 65 is in engagement with the spindle gear 67 to transmit power from the main drive motor in the base for driving the tool spindle 18.

Power for driving the slidable work supporting members including the knee 21, the saddle 22 and the table 23 at a selected work feeding rate as well as at a rapid traverse rate is likewise derived from the main drive motor 26 in the base as shown in FIGS. 1 and 2. A complete description of the construction and arrangement of the power drive is set forth in the aforementioned copending parent patent application Serial No. 436,358, filed June 14, 1954, which issued as Patent No. 2,843,024.

Figure 3:
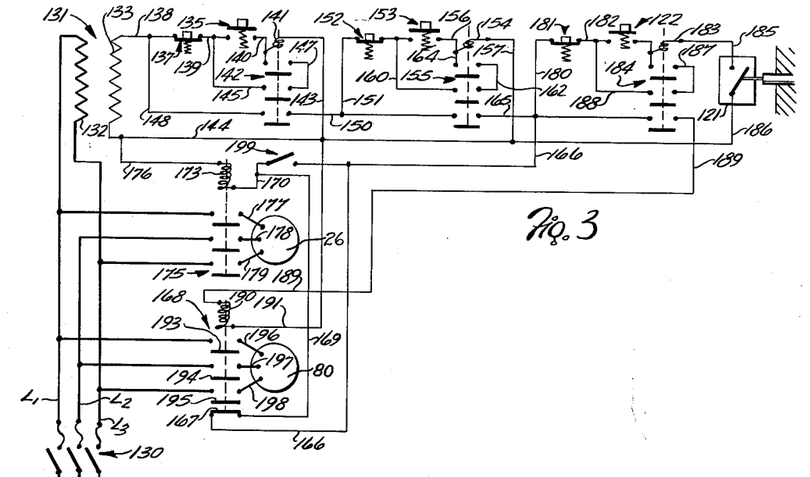
FIG. 3 is a schematic circuit diagram of the actuating control circuit for selectively energizing one or the other of the motors employed to drive the spindle.

The operative details of the control circuit for effecting selective energization of the main motor 26 in the base and the high speed spindle head motor 80 are illustrated in simplified diagrammatic form in FIG. 3. As there shown, electrical energy for operating the various motors and control elements is derived from line conductors $L_1$, $L_2$ and $L_3$, the line conductors being connected to a source of power by means of a disconnecting switch 130 in the usual manner. In order to energize the motors or any of the control elements, it is necessary to energize a main control circuit that is represented by light lines in the drawings. Power for the main control circuit is obtained from a transformer 131 having a primary winding 132, one terminal of which is connected to the line conductor $L_1$, and one of the other line conductors, in this instance the conductor $L_3$ being connected to one or another of a series of taps on the primary winding depending on the voltage of the supply current. A secondary winding 133 of the transformer 131 is adapted to supply energy at the desired voltage for the main control circuit. Although not shown in the drawings, the usual fuses and overload devices are interconnected at appropriate points in the control circuit in well known manner to afford protection to the entire apparatus in the event of a short circuit or other overload condition.

Energization of the main control circuit for the entire machine is effected by depressing a normally open master switch start button 135 constituting part of a master control station, that is provided with a master switch stop button 137. With the master start switch 135 moved to momentary closed position, current will flow from one terminal of the transformer secondary 133 through a conductor 138, the normally closed contact bar of the master stop switch 137, a conductor 139 and the closed contact bar of the master start switch 135 to a conductor 140. From the conductor 140, the flow of current continues through a coil 141 of a master start relay 142 to a conductor 143, and an energized conductor 144 connected to the opposite terminal of the transformer secondary 133. Energization of the solenoid coil 141 in this manner causes the master control relay 142 to move to a closed position, thereby effecting closure of three sets of contact bars. A holding circuit for retaining the master relay 142 in closed position when the master start button 135 is released, is then established through a shunting conductor 145 leading from the conductor 139 interconnected between the master push button switches 135 and 137. From the conductor 145, the holding circuit continues, through one set of contacts and a closed contact bar of the relay 142 to a conductor 147, and thence through another closed contact bar to the conductor 140 leading to one terminal of the coil 141.

With the master control relay 142 in closed position, an energized control circuit is established from one terminal of the transformer secondary winding 133, the conductor 138, a conductor 148, and a closed contact bar of the relay 142, to energize a conductor 150. Whenever the conductor 150 is energized, the various other control elements and switches of the master control circuit are selectively operable to energize one or another of the motors. On the other hand, depressing the master push button stop switch 137 interrupts the holding circuit to the coil 141, permitting the master relay 142 to drop to an open position to interrupt the flow of current to the conductor 150 to deenergize the master control circuit.

With the master relay 142 closed to energize the conductor 150, a circuit may be completed through a conductor 151 leading to a pair of motor start push button switches 152 and 153 adapted to selectively control the energization of the main drive motor 26, as well as to condition a control circuit for selectively energizing the separate high speed spindle driving motor 80. Energization of the main drive motor 26 is effected by momentarily depressing the normally open push button switch 153 to energize a coil 154 of a relay 155 by completing a circuit leading from the energized conductor 151, through the normally closed contact bar of the stop button switch 152, the closed contact bar of the start switch 153 to a conductor 156 connected to one terminal of the solenoidal coil of the relay. Current flowing through the coil 154 effects its energization, resulting in upward movement of the relay 155 to a closed position, and with a return circuit from the coil 154 being completed through a conductor 157 connected to the energized return conductor 144. Movement of the relay 155 to a closed position in turn effects movement of the contact bars to bridge three sets of contacts associated therewith.

Upon release of the normally open push button switch 153, a holding circuit for the relay 155 is established through a shunting conductor 160 leading from one terminal of the normally closed push button switch 152, through the closed contact bar of the relay 155 to a conductor 162, and thence through another closed contact bar to a conductor 164 connected to one terminal of the coil 154. With the relay 155 energized to a closed position, the energized conductor 150 is connected through the closed contact bar thereof to energize a conductor 165. From the energized conductor 165, a control circuit for energizing the motor 26 is then completed through conductor 166 and a normally closed interlocking contact bar 167 of a starting relay 168 for the high speed spindle motor 80. With the relay 168 in deenergized position, the control circuit continues through the normally closed contact bar 167 thereof to a conductor 169 and thence through a conductor 170 connected to one terminal of a coil 173 for the main motor starting relay 175.

The return circuit from the coil 173 continues through a conductor 176 connected to the energized return conductor 144. Thus, a control circuit is completed for energizing the coil 173 to urge the relay 175 to an upwardly closed position. Closure of the relay 175 in turn effects movement of the three contact bars thereof into closed position for transmitting current from the line conductors L₁, L₂ and L₃ to the conductors 177, 178 and 179 that are connected to energize the main driving motor 26.

As a prerequisite to energizing the high speed motor 80 for driving the spindle at high speed rates, it is necessary to pivot the shifter crank 75, FIG. 5, downwardly to shift the spindle driving gear 65 upwardly into disengaged position. Movement of the gear 65 to its upward position operates to interrupt the transmission of power from the main drive motor 26 to the spindle 18, and, simultaneously therewith, actuates the normally open interlocking switch 121, FIGS. 3 and 5, to a closed position for permitting selective energization of the high speed spindle driving motor 80. With the interlocking switch 121 closed, a normally open start button switch 122 associated with the high speed spindle motor 80 may be momentarily depressed for completing a control circuit from the energized conductor 165, a branch conductor 180 and through the contact bar of a normally closed spindle stop button switch 181. The circuit continues through a conductor 182, and thence through the closed contact bar of the start switch 122 to one terminal of a solenoidal coil 183 of a relay 184. From the opposite terminal of the coil 183, the circuit continues through a conductor 185, the contact bar of the closed interlocking switch 121, and a conductor 186 connected to the energized return conductor 144. Closure of the start button switch 122 thus effects energization of the coil 183, whenever the interlocking switch 121 is moved to closed position, which, in turn, operates to move the three sets of contacts associated therewith. A holding circuit for the relay 184 is then established from one terminal of the coil 183 through the upper closed contact bar to a conductor 187 and through another closed contact bar to a shunting conductor 188 to the conductor 182 interconnected between the stop switch 181 and the start switch 122.

With the relay 184 being retained in closed position, a control circuit is then established from the energized conductor 165, through the closed contact bar of the relay 184 leading to a conductor 189 connected at its opposite end to one terminal of a coil 190 of the starting relay 168 for the high speed motor 80. The flow of current continues through the coil 190 to a conductor 191 connected to the energized return conductor 144. The control circuit thus completed effects energization of the coil 190 to move the contact bars of the relay 168 upwardly for energizing the high speed spindle motor 80 and, simultaneously therewith, deenergizing the main drive motor 26 in the base. Upward movement of the relay 168 effects movement of the three contact bars 193, 194 and 195 into position for bridging the three pairs of contacts associated therewith for transmitting current from the line conductors L₁, L₂ and L₃ to the branch conductors 196, 197 and 198, for energizing the high speed spindle motor 80. At the same time, the normally closed contact bar 167 of the relay 168 is moved upwardly to an open position to interrupt the holding circuit to the coil 173 of the relay 175, thus allowing the relay to drop to open position for deenergizing the main drive motor 26.

In the event it is desired to re-energize the main motor 26 when the high speed spindle motor 80 is operating, there is provided an additional switch 199 that is selectively operable to complete a shunt control circuit for energizing the coil 173 whenever the normally closed contact bar 167 of the relay 168 is moved to open position. Actuating the switch 199 to a closed position operates to complete a shunt control circuit from the energized conductor 166, the closed contact bar of the switch 199 directly to the conductor 170. Thus, closure of the switch 199 effects movement of the relay 175 to a closed position for re-energizing the main drive motor 26 in the base. By means of this arrangement, the main drive motor 26 is energizable for driving one or another of the work supporting members 21, 22 and 23 when the spindle 18 is being driven at high speeds by the high speed motor 80.

From the foregoing explanation of the construction and operation of a preferred embodiment, it is apparent that there has been provided an improved spindle head that is operable over a relatively wide range of operating speeds and is provided with novel means to compensate for bearing expansion or contraction. Thus, the high speed motor may be employed to drive the spindle whenever a machining operation, particularly those involving non-ferrous materials, requires extremely high cutter speeds; or the spindle may be driven at a relatively lower speed through the basic power source of the machine tool in which the present invention may be incorporated, when normal or conventional operations are being performed. Adequate protection is incorporated to prevent accidental energization of the high speed motor whenever the spindle is being driven by the basic power source of the machine tool.

Although only one principal embodiment of the invention has been shown and described, it will be apparent to one skilled in the art to which this invention relates, that various modifications in the manner of constructing the machine may be made without departing from the spirit and scope of the invention as defined in the subjoined claims.

The principles of this invention having now been fully explained in connection with the foregoing description, we hereby claim as our invention:

1. In a machine tool provided with a vertical tool spindle adapted to be driven at a selected one of an extremely wide range of output speeds, a hollow spindle head adapted to rotatably support said tool spindle, a flat horizontal shield extending across the hollow central portion of said spindle head and being provided with an aperture through which said tool spindle extends, said flat shield being provided with a vertically upstanding sleeve encircling said spindle and an outwardly spaced vertically upstanding circular ridge concentric with said sleeve, a spindle drive gear secured to said spindle immediately above said flat horizontal shield, said drive gear being provided on its underside with an upwardly extending enlarged recess adapted to encompass the upstanding sleeve presented by said shield and a concentric groove adapted to encompass the circular ridge presented by said flat shield, said gear being disposed to cooperate with said shield in a manner to prevent the admission of lubricant therebelow, a variable speed transmission including shiftable gearing selectively engageable with said spindle drive gear for rotating said tool spindle at a selected speed throughout a relatively low range of speeds, and a high speed motor selectively energizable to rotate said spindle at an extremely high speed, said high speed motor comprising a rotor secured to said tool spindle below said shield and a cooperating stator carried within said spindle head.

2. In a milling machine having a tool spindle adapted to be driven throughout an extremely wide selection of operating speeds, a pair of axially spaced apart bearings adapted to rotatably support said tool spindle, one of said bearings being carried for limited axial movement relative to the other of said bearings to compensate for temperature changes as said spindle is operated at different selected speeds within its allowable range of speeds, a high speed driving motor including a rotor carried by said tool spindle, circuit means including a source of electrical energy and a normally open interlocking switch operatively connected to selectively control the energization of said high speed motor, a variable speed transmission mechanism operatively connectable to drive said tool spindle independently of said high speed motor, a second motor connected to drive said transmission mechanism, a disengageable clutch mechanism operatively connected to transmit driving power from said transmission mechanism to said spindle, a shifting device operatively connected to move said clutch mechanism to an engaged or to a disengaged position respectively, and linkage mechanism operative to actuate the said normally open switch to a closed position whenever said shifting device is operated to shift the said clutch mechanism to a disengaged position for rendering said high speed motor energizable to drive said tool spindle.

3. In a milling machine of the vertical spindle type, a column, a vertically movable spindle head slidably carried toward the front upper portion of said column, a vertical tool spindle rotatably journalled in said spindle head, lower antifriction bearing means carried within said spindle head adapted to rotatably support the lower tool retaining end of said spindle, said antifriction bearing means being adapted to restrain the lower tool retaining end of said spindle against axial movment in either direction, upper antifriction bearing means affixed to said spindle in upwardly spaced axial relationship to said lower bearing means, said upper bearing means being guidably supported by said spindle head for limited axial movement to rotatably support said spindle for rotation concentrically with said lower bearing means, predeterminately adjustable resilient means adapted to urge said upper bearing means axially relative to said tool spindle and relative to said spindle head, said resilient means exerting sufficient axial force to preload said upper bearing means to rotatably support said spindle for concentric rotation irrespective of its selected operating speed, said resilient means being sufficiently flexible to permit axial movement of said upper bearing means to obviate overloads on said upper bearing means and said lower bearing means whenever said tool spindle expands longitudinally due to its being rotated at extremely high speeds.

4. In a machine tool of the vertical spindle type, a column, a spindle head movably carried by said column for selective vertical adjustment, a rotatable tool spindle journalled in said spindle head, a high speed spindle driving motor carried in said head, said high speed motor comprising a rotor secured to said spindle and a cooperating stator carried within said head, a control circuit including a source of electrical energy and control means operatively connected to selectively energize said high speed motor for driving said spindle, separate switching means operatively interconnected in said control circuit adapted to be actuated to open position to prevent the energization of said high speed motor by said control means, a driven gear keyed to said spindle, shiftable gearing contained in said spindle head disposed to be selectively shiftable from a neutral position into driving engagement with said driven gear, a variable speed transmission mechanism including clutch disconnecting means carried by said column and being operatively connected to drive said shiftable gearing at a selected speed rate throughout a low range of operating speeds, a main drive motor contained in said column connected to drive said transmission mechanism, and shifting means connected to effect selective movement of said shiftable gearing into engaged position relative to said driven gear and simultaneously therewith to actuate said switching means to an open position to preclude the driving of said spindle by said high speed motor whenever said spindle is connected to be driven by said transmission mechanism.

5. In a machine tool, a column, a hollow spindle head slidably carried by said column for selective vertical adjustment, a centrally apertured shield extending across the interior of said spindle head to divide the interior thereof into hollow upper and lower compartments, a vertical tool spindle having a lower tool retaining end rotatably journalled in said spindle head disposed to extend through the aperture in said shield, a selectively energizable high speed motor carried within the lower compartment formed in said spindle head, said motor comprising a rotor secured to said spindle and a cooperating stator secured to said head, a spindle drive gear secured to the upper portion of said spindle above said shield, said spindle gear being provided with an enlarged circular recess and an outwardly spaced concentrically formed circular groove extending upwardly from the underside thereof, a circular sleeve tightly fitted within the aperture formed in said shield disposed to extend upwardly into the circular recess formed in said gear, said shield being provided with a circular ridge concentric to said sleeve disposed to extend upwardly into the circular groove formed on the underside of said gear, said sleeve and the circular ridge associated with said shield being respectively disposed to cooperate with the circular recess and groove presented by said gear to prevent the admission of lubricant from said upper compartment into said motor compartment, a variable speed transmission including a power source in said column, shiftable gearing in said spindle head driven by said transmission and being selectively engageable wtih said spindle gear to drive said spindle at a selected one of low operating speeds independently of said high speed motor, antifriction bearing means carried within said spindle head below said high speed motor adapted to rotatably support the lower tool retaining end of said spindle for restraining it against axial movement in either direction, antifriction bearing means secured to the upper portion of said tool spindle and being movably guided by said spindle head for limited axial movement, and predeterminately adjustable resilient means connected to urge said upper bearing means axially with respect to said lower bearing means.

6. In a machine tool, a vertically adjustable hollow spindle head, a centrally apertured horizontal flat shield extending across the interior of said spindle head to divide the interior into a hollow upper gear compartment and a hollow lower motor compartment, a vertical tool spindle having a lower tool retaining end rotatably journalled in said spindle head disposed to extend through the aperture formed in said shield, a high speed driving motor carried within the motor compartment formed in said spindle head and comprising a rotor secured to said spindle and a cooperating stator carried within said head, a spindle drive gear secured to the upper portion of said spindle above said shield, said spindle drive gear being provided with an enlarged circular recess extending upwardly from the lower face thereof and an outwardly spaced circular groove concentric with the circular recess and with said tool spindle, a circular sleeve tightly fitted within the central aperture formed in said shield disposed to extend upwardly into the circular recess formed in said gear, said flat shield being provided with a concentric upstanding circular wall disposed to extend upwardly into the circular groove formed in the underside of said gear, the said sleeve and the circular wall associated with said flat shield being respectively disposed to coact with the circular recess and circular groove presented by said gear to preclude the admission of lubricant from said gear compartment into said lower motor compartment.

7. In a milling machine, a hollow spindle head, a vertical tool spindle rotatably journalled in said spindle head, a flat horizontal shield extending through the central portion of said hollow spindle head presenting a circular aperture through which said tool spindle extends, said flat shield being disposed to divide said spindle head into hollow upper and lower compartments, said shield being provided with a circular sleeve extending upwardly from the aperture formed therein to closely encircle a small portion of said spindle and said shield being provided with an outwardly spaced vertically upstanding ridge concentric to the sleeve presented thereby, a spindle drive gear secured to said spindle immediately above said shield, said gear being provided in its hub with an upwardly extending circular recess and a concentrically formed groove in its lower face disposed to respectively encompass the circular sleeve and circular ridge presented by said shield, said gear, and said shield being disposed to so cooperate as to prevent the admission of lubricant from the upper compartment of said spindle head into the lower compartment thereof, a variable speed transmission including shiftable gearing selectively engageable with said gear for driving said spindle at one of a wide range of low operating speeds, a selectively energizable high speed motor in said lower compartment adapted to drive said spindle at extremely high speeds independently of said transmission, lower antifriction bearing means secured to the lower end of said spindle restrained by said spindle head against axial movement in either direction, spaced apart antifriction bearing means secured toward the upper end of said spindle and being movably guided by said spindle head for limited axial movement in either direction, resilient means connected to urge said movable upper bearing means axially relative to said spindle and relative to said lower bearing means whereby said movable bearing means are axially movable as said tool spindle expands longitudinally due to excess heat generated whenever said spindle is operated at high speeds by said high speed motor.

8. In a milling machine, a column, a hollow vertically adjustable spindle head slidably carried toward the front upper portion of said column, a vertical tool spindle rotatably carried by said spindle head, power transmitting means including a power driven variable speed transmission mechanism carried within said column and an independently energizable high speed motor carried within said spindle head, said transmission and said high speed motor being respectively and selectively connectable to drive said tool spindle at a selected one of an extremely wide range of speed rates, selectively adjustable control means operatively connected to selectively connect said power transmitting means to drive said tool spindle, antifriction bearing means carried within the lower portion of said spindle head, said bearing means being adapted to rotatably support the lower tool retaining end of said spindle and restrain it against axial movement in either direction, an anti-friction bearing spaced upwardly from said bearing means having an inner race secured to the upper portion of said spindle and an outer race guidably carried by said spindle head for limited axial movement, and predeterminately adjustable resilient means adapted to urge the outer race of said bearing axially with respect to the inner race thereof for rotatably supporting the upper end of said spindle in concentricity with the lower tool retaining end thereof irrespective of the longitudinal expension and contraction of said spindle due to the changes in operating temperatures caused by driving the spindle at one of an extremely wide range of operating speeds.

9. In a machine tool, a spindle carrying structure, a vertical tool spindle rotatably journalled in said structure, said tool spindle being provided with a lower tool retaining end and being rotatable throughout an extremely wide range of output speeds, lower antifriction bearing means adapted to rotatably support the lower tool retaining end of said spindle and adapted to restrain it against axial movement in either direction, upper antifriction bearing means secured to said spindle in upwardly spaced relationship relative to said lower bearing means, said upper bearing means being guidably supported by said structure for axial slidable movement relative to said lower bearing means for rotation in exact concentricity therewith irrespective of the speed of rotation of said spindle, a variable speed mechanism including a main drive power source shiftably connectable to drive said tool spindle at a selected speed rate in a relatively low range of driving speeds, and a high speed motor selectively energizable to rotate said spindle at extremely high speed independently of said speed transmission, said high speed motor comprising a rotor secured to said spindle intermediately said lower bearing means and said upper bearing means and a cooperating stator carried within said spindle head.

10. In a machine tool, a frame, a vertically adjustable spindle head carried by said frame, a rotatable tool carrying spindle journalled in said spindle head, a pair of closely spaced antifriction bearings carried by said spindle head adapted to rotatably support the tool retaining end of said spindle, means for preloading said bearings in a manner to restrain the tool carrying end of said spindle against axial movement in either direction, a third bearing adapted to rotatably support a spaced apart portion of said tool spindle, said third bearing being guidably carried by said spindle head for limited axial movement relative to said pair of bearings, adjustable resilient means connected to urge said third bearing for axial movement relative to said pair of bearings, a high speed motor connected to drive said spindle, said high speed motor comprising a rotor secured to said spindle intermediately said third bearing and said pair of bearings, and a cooperating stator secured to said spindle head, a control circuit including a source of electrical energy and an interlocking switch connectable to energize said high speed motor, shiftable gearing connectable to drive said tool spindle independently of said high speed motor, a power driven rate changer connected to drive said shiftable gearing, and a shifting lever connected to shift said shiftable gearing for connecting said rate changer to drive said tool spindle, said shifting lever being connected to actuate said interlocking switch to an open circuit interrupting position to prevent energization of said high speed motor whenever said spindle is driven by said rate changer.

11. In a machine tool having a tool spindle adapted to be driven at a selected one of an extremely wide range of output speeds, a column, a spindle head carried by said column, a tool spindle journalled in said spindle head, a high speed spindle driving motor connected to rotate said spindle at a high speed, a control circuit including a source of electrical energy and control means operatively connected to selectively energize said high speed motor for driving said spindle, switching means operatively interconnected in said control circuit and adapted to be actuated to open position to prevent the energization of said high speed motor by said control means, a variable speed transmission mechanism operatively connectable to drive said tool spindle at a selected speed rate throughout a low range of operating speeds, a main drive motor connected to drive said transmission mechanism, a clutch operatively connected to transmit the drive from said transmission mechanism to said spindle when engaged, and clutch actuating means connected to effect selective engagement of said clutch for connecting the drive from said transmission to said spindle and simultaneously therewith to actuate said switching means to an open position to preclude the driving of said spindle by said high speed motor whenever said spindle is connected to be driven by said transmission mechanism.

12. In a machine tool having a tool spindle adapted to be driven at a selected one of an extremely wide range of output speeds, a frame, a spindle head carried by said frame, a tool spindle journalled in said spindle head, a high speed spindle driving motor carried in said head and connected to rotate said spindle at a high speed, said high speed motor comprising a rotor secured to said spindle and a cooperating stator carried within said head, a variable speed transmission mechanism operatively connectable to drive said tool spindle at a selected speed rate throughout a low range of operating speeds, a main drive motor mounted in said frame and connected to drive said transmission mechanism, and control means operative to selectively connect said high speed spindle driving motor and said variable speed transmission mechanism for driving said tool spindle so that only one or the other is operative at any one time for driving said tool spindle.

References Cited in the file of this patent

UNITED STATES PATENTS

| | | |
|---|---|---|
| 1,773,427 | Larsh | Aug. 19, 1930 |
| 2,352,469 | Carlson | June 27, 1944 |
| 2,432,383 | Colwell | Dec. 9, 1947 |
| 2,484,885 | Hassman et al. | Oct. 18, 1949 |
| 2,597,161 | Megel et al. | May 20, 1952 |
| 2,629,293 | Eserkaln | Feb. 24, 1953 |

FOREIGN PATENTS

| | | |
|---|---|---|
| 522,980 | Belgium | Oct. 15, 1953 |